Dec. 22, 1964  A. DUCROT  3,161,892
SELF-SUPPORTING FOLDING BEDS WITH A VIEW TO
UPHOLSTER THEM INTO FURNITURE
ELEMENTS WHEN THEY ARE FOLDED
Filed Sept. 26, 1961  6 Sheets-Sheet 1
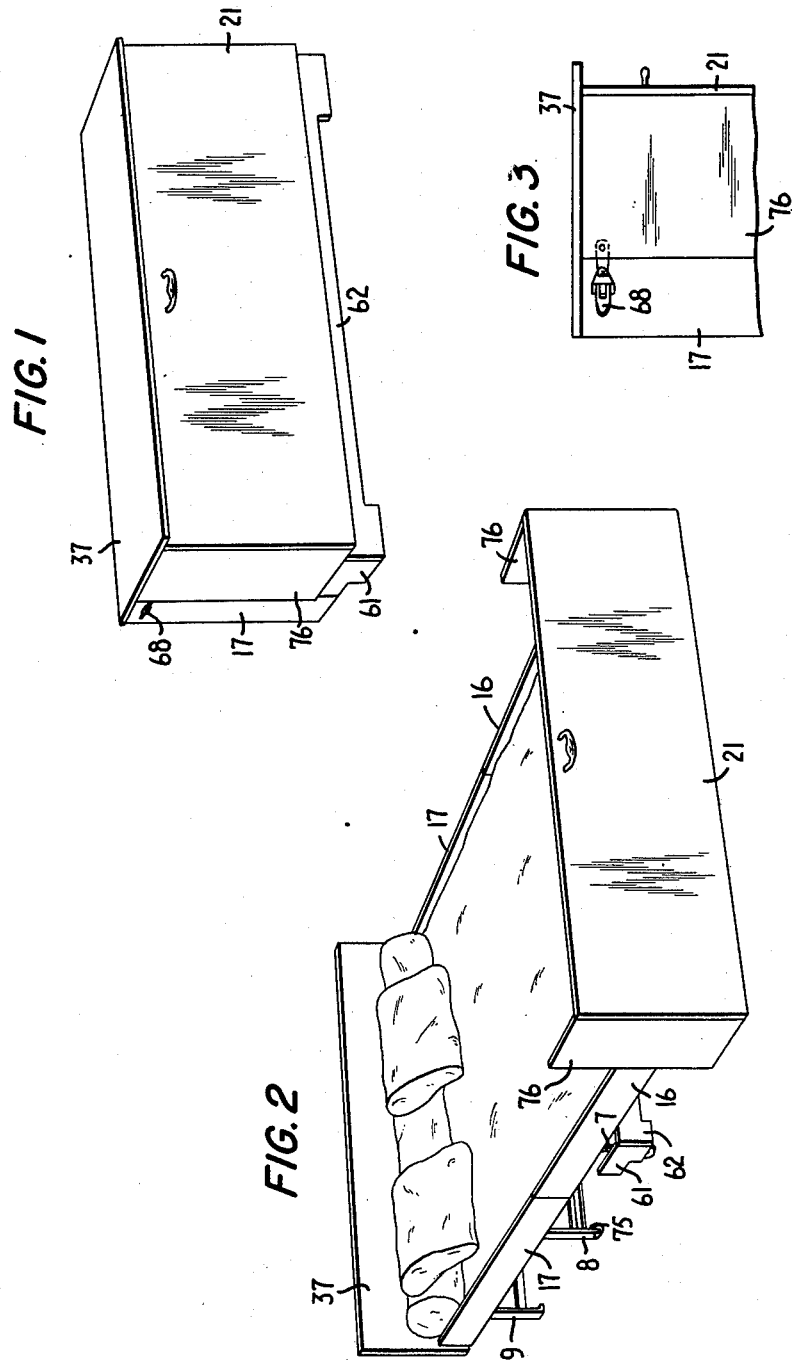

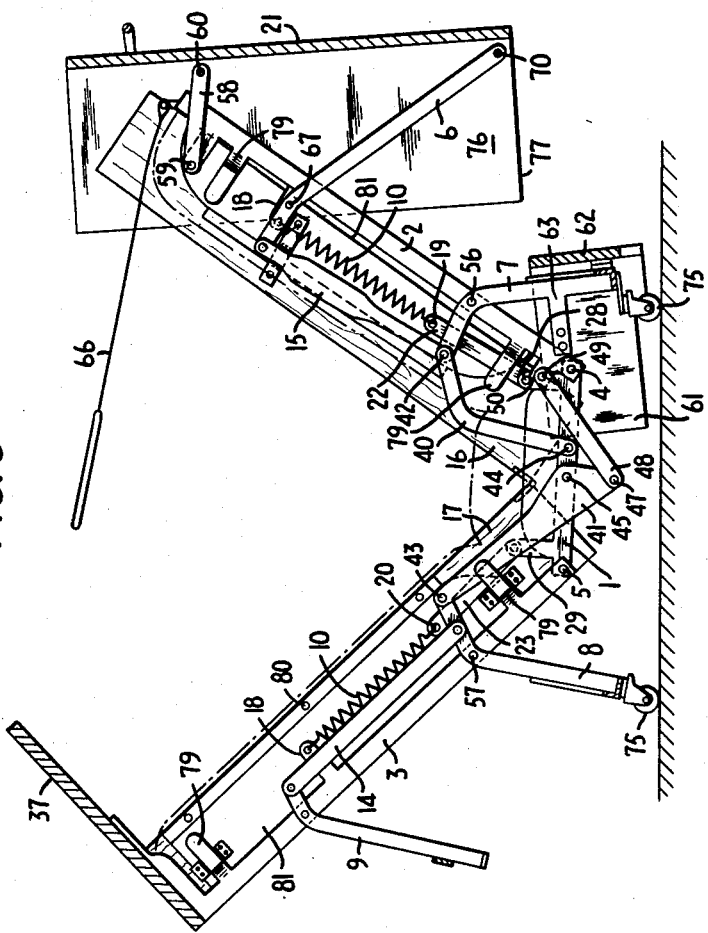

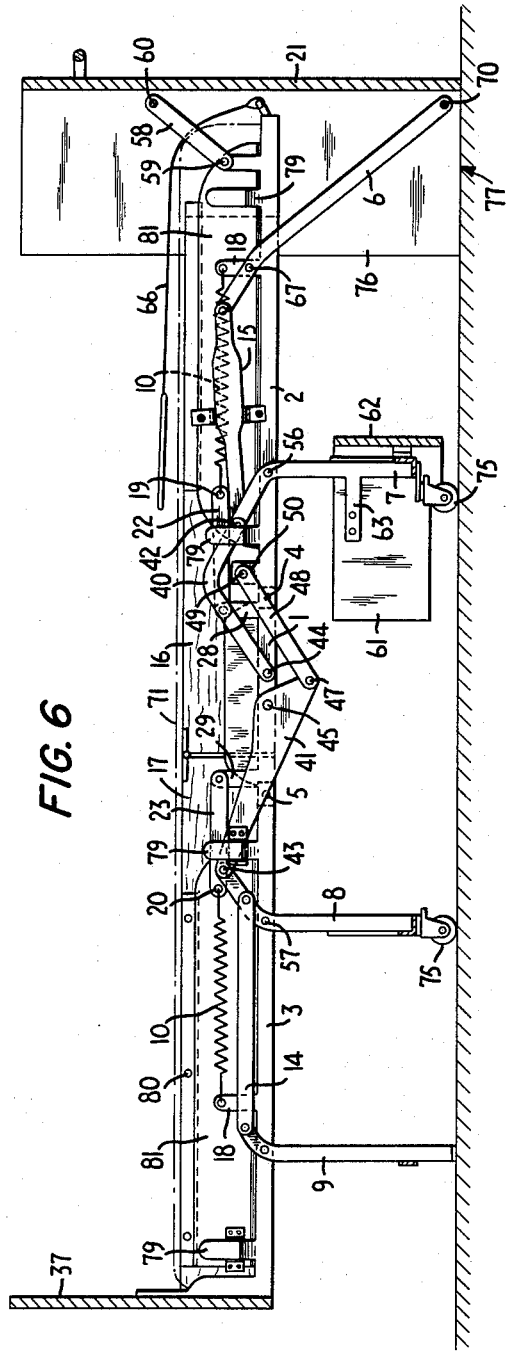
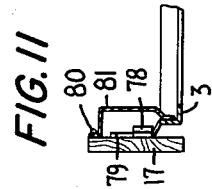
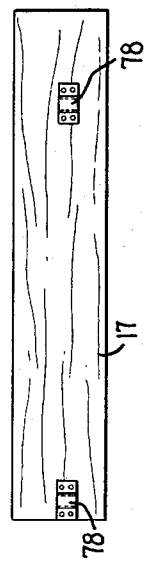

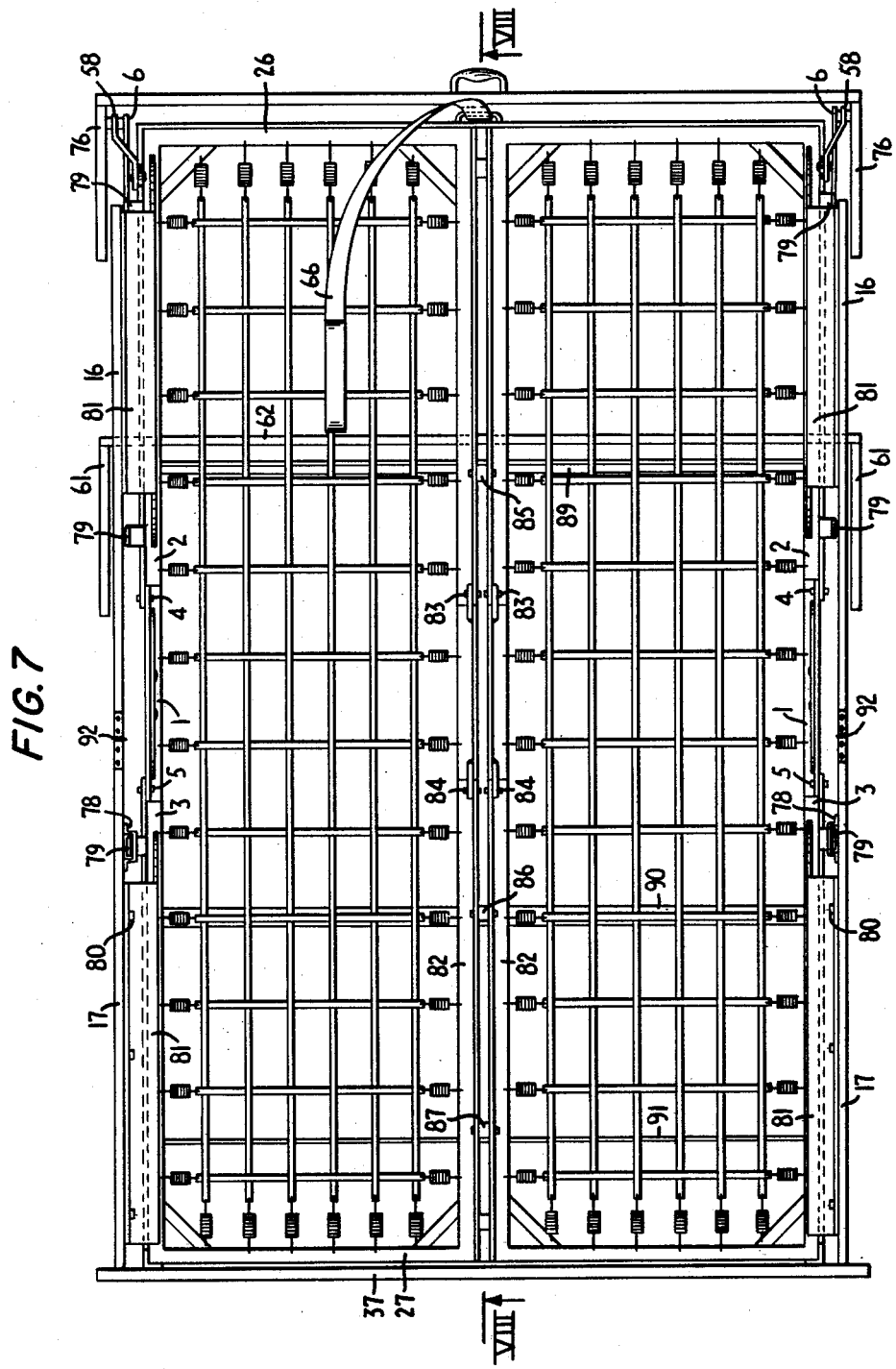

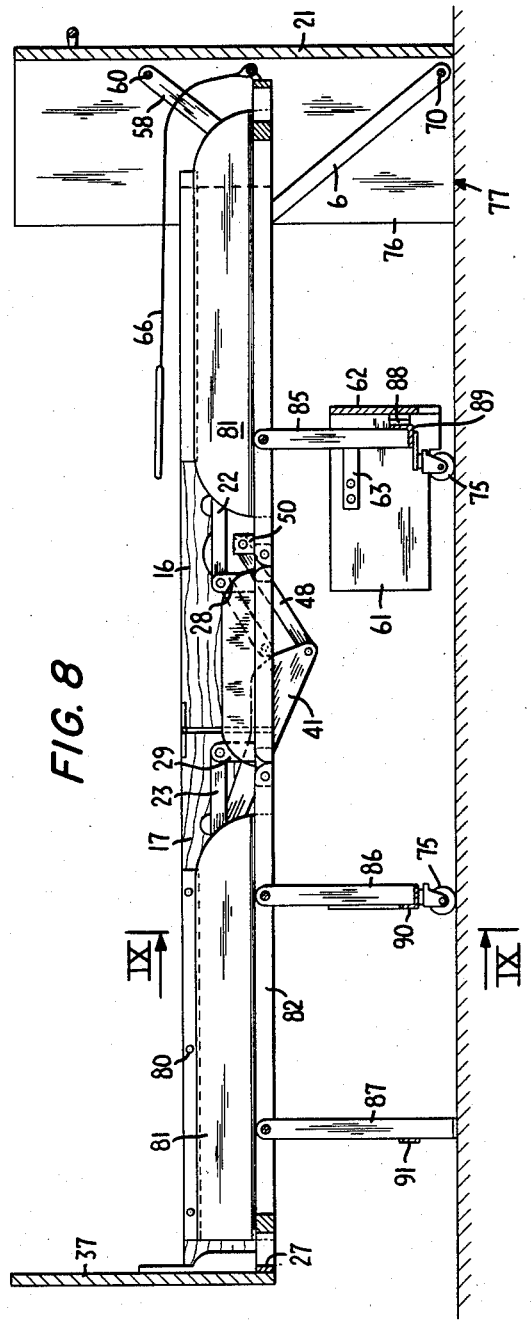
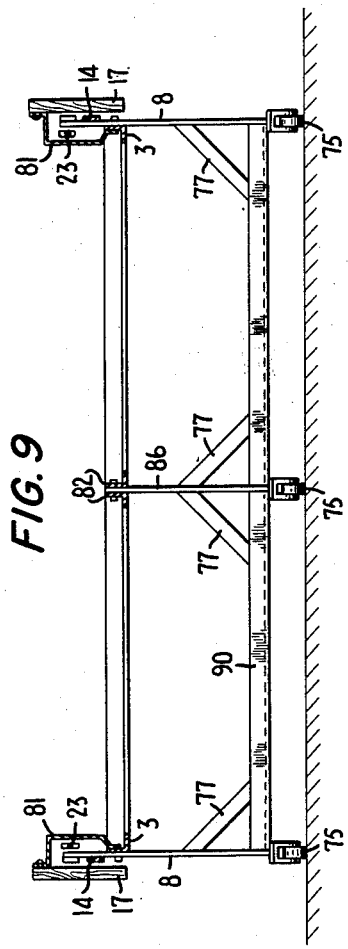

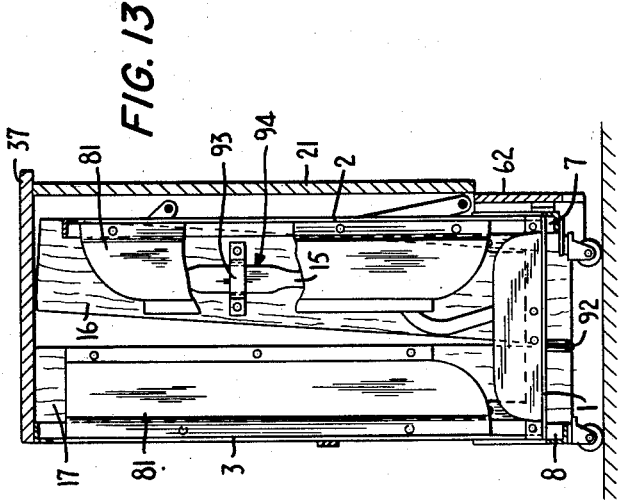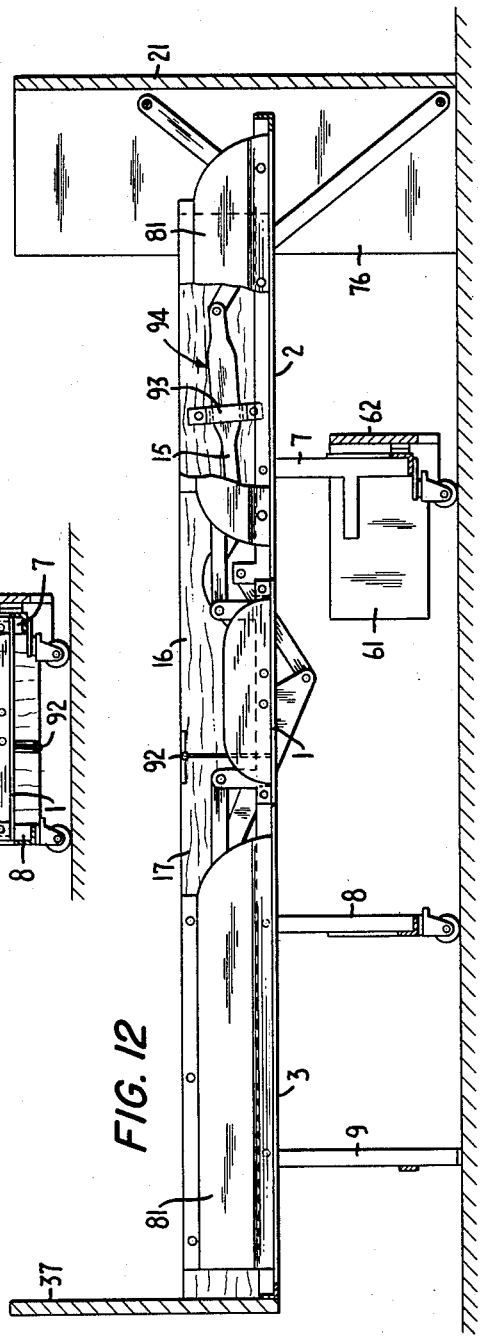

United States Patent Office 3,161,892
Patented Dec. 22, 1964

3,161,892
SELF-SUPPORTING FOLDING BEDS WITH A VIEW TO UPHOLSTER THEM INTO FURNITURE ELEMENTS WHEN THEY ARE FOLDED
Albert Ducrot, 20 Rue Rampal, Paris, France
Filed Sept. 26, 1961, Ser. No. 140,786
Claims priority, application France, Oct. 17, 1960, 841,380, Patent 1,063,529
3 Claims. (Cl. 5—5)

Nowadays, beds, due to their dimensions, have become almost abnormally cumbersome and troublesome pieces of furniture in many home arrangements. This accounts for the great number of attempts made since the beginning of this century with a view of solving this difficult problem chiefly by adhering to two principles, some designers endeavouring to make folding or collapsible beds adapted to fit in a cabinet or the like, while others considered the sofa-bed solution as the most convenient for the purpose.

Considering the obvious principle that a conventional bed has only one defect, that is, its cumbersomeness, the applicant was led to the idea that all the component elements of a conventional bed, that is, the head and foot panels and bedding supported by a spring mattress—wherein the bedding could remain ready with the sheets and blankets—should be hingedly interconnected in such a manner that they can be folded up and placed against a wall within a very reduced space while having in this folded condition the appearance of a real wall-engaging cabinet or like piece of furniture.

In the folded condition, the bed mounted on castors may be moved freely from one room to another in an apartment or in the house, and in the unfolded position it is characterized by the same appearance and comfort as any conventional bed.

The conventional rigid bed, with head and foot panels and long side members, is collapsible into a decorative cabinet according to this invention and characterized in that the two end elements of the carrier frame, which are hingedly mounted about two transverse axes on an intermediate element of said carrier frame on which the other elements are folded, are connected with end panels whereby these panels, in the unfolded position, constitute the head and foot panels of a conventional bed and, in the folded position, constitute juxtaposed panels fitting over the frame and forming a cabinet in which the bed and bedding are concealed.

To this end one of the end elements of the bed frame is rigid with a transverse panel perpendicular thereto and having a height substantially equal to the length of the intermediate element and to the other end element is positively connected a perpendicular two-section coffer-like member having a U-shaped horizontal section, a height substantially equal to the length of said end element and a length parallel to the longitudinal direction of the intermediate frame element substantially equal to the length of same. This panel and said coffer elements are dimensioned to constitute the head and foot of a conventional bed and to align themselves against the frame of the folded bed so as to give a cabinet-like appearance to the folded assembly.

The carrier frame is supported preferably by three pairs of legs, that is, two pairs hingedly mounted on an end element and having their extensions above the relevant element pivoted each on one end of a control link pivotally mounted on the side member of the intermediate element and having its opposite end pivoted through a connecting rod on the other end element, and a pair of legs pivoted on the other end element and connected through rods to said intermediate element, whereby these pairs of legs may simultaneously move toward and away from the end elements.

The positive connection between the two-section U-shaped coffer-like structure and one of the end elements is through links pivoted on the end element supporting same, whereby the coffer-like structure will act as a floor-engaging bed support surrounding the folded bed on three sides, the end panel of the other end element constituting the top of the bed when the latter is converted into a cabinet or the like.

According to another feature characterizing this invention, the side longitudinal members of the frames associated with said end elements are lined with long side panels for concealing the hinges and constituting facing elements.

Another feature characterizing this invention is that the operation of the bed is facilitated by the position of the lateral compensation springs connected to the control links for balancing the weight of the end elements of the spring-mattress. The closing movement is facilitated by a strap secured on one of the end elements which can be pulled upwards without effort for readily initiating the folding of the two end elements which are subsequently brought completely against each other.

A typical embodiment of a bed constructed according to the teachings of this invention will now be described more in detail with reference to the attached drawings wherein:

FIGURE 1 is a perspective view of the bed in its folded or closed position;

FIGURE 2 is a perspective view showing the same bed in its open or unfolded position;

FIGURE 3 illustrates the details of the device for locking the side panels;

FIGURE 4 is a side elevational view showing the bed in its closed position with the side panels removed;

FIGURE 5 is a similar view showing the bed during the change from open position to cabinet position, or vice-versa;

FIGURE 6 is a side elevational view showing the bed in its open position;

FIGURE 7 is a corresponding plan view;

FIGURE 8 is a longitudinal section taken upon the line VIII—VIII of FIG. 7;

FIGURE 9 is a cross section taken upon the line IX—IX of FIG. 8;

FIGURES 10 and 11 are views showing respectively a long side panel and its mounting on the carrier frame;

FIGURE 12 is a longitudinal section showing the bed equipped with the side long panels; and FIGURE 13 is a section similar to FIG. 12 but showing the bed in its folded condition.

The essential structure of this collapsible bed comprises an underslung frame consisting of three elements hingedly interconnected, that is, a central or intermediate element consisting of a pair of parallel beams 1, and two end elements of substantially equal length 2, 3 hingedly mounted on said central element on transverse axes 4, 5 and provided with end cross members 26, 27 and gussets.

Two pairs of legs 7, 8 braced to maintain the parallelism of the spring-mattress and mounted on castors 75 are pivoted on pins 56, 57 of the side elements 2, 3 and formed with extensions up to the pivot pins 42, 43 on pair of links 40, 41 pivoted in turn on the intermediate element at 44 and 45 respectively. Connecting links 48 are pivoted at 47 on the extension of links 41 and at 49 on an elbow 50 of each longitudinal member 2.

Pivoted on each longitudinal member 2 is a rod 6 associated with another rod 58 pivoted in turn on a pin 59 carried by a perpendicular projecting arm of longitudinal beam 2. A U-shaped coffer element 21, consisting of a transverse panel and of a pair of lateral panels 76, is secured on the ends 70 and 60 of rods 6 and 58.

The legs 7 are provided with perpendicular projecting arms 63 on which is secured another U-shaped coffer element 62 consisting of parallel vertical lateral panels 61 braced on one side by another panel.

The U-shaped coffer comprised of sections 21 and 62 has a total height substantially equal to the length of the end frame element 2 and a length parallel to the intermediate frame element substantially equal to the length of same.

Links 14 and 15 are provided for rigidly interconnecting respectively the pairs of legs 8, 9 of element 3 and the pair of legs 7 and the aforesaid rods 6 of coffer section 21 of element 2.

These various pivotal or hinged connections are so designed and located that during the unfolding of the bed the coffer section 21 accomplishes a vertical movement of translation (FIG. 5) whereby the bed is moved from the closed bed position in which it is co-extensive with coffer section 62 (FIG. 4) to the open bed position in which it rests on the floor (FIG. 6).

The dimensions of the panels constituting the facing incorporating the coffer sections 21 and 62, and the lengths of rods 58 and 6 are such that at the end of the aforesaid movement of translation both coffer sections 21 and 62 are superposed in vertical alignment, without leaving any gap therebetween, when the bed is closed, and that the main coffer section 21 bears on the floor when the bed is open, as rods 6 and 58 act only as guide members.

A panel 37 secured on the end of the opposite lateral element constituting the head of the bed is adapted, when the bed is folded to its cabinet position, to fit completely over the assembly to constitute the top of a three-sided cabinet or chest, its height being equal to the length of the intermediate element.

Relatively long panels 16 and 17 conceal the longitudinal beams 2 and 3 of the frame.

The mattress 71 shown in chain-dotted lines in the drawings remains constantly in position on the spring-mattress irrespective of the bed opening and closing movements, without undergoing any distortion or displacement, so that the bedding may be left permeanently made.

To facilitate the bed folding operation, tension coil springs 10 are provided laterally on each end element, these springs having each one end anchored on a lug 18 of frame 2 or 3 and the other end anchored at a point 19 or 20 of a flat rod 22 or 23 pivoted on a lug 28 or 29 of the central element. A trap 66 attached on the end of element 2 enables the user to close the bed by moving the coffer section 21 toward the panel 37.

As shown in FIGS. 7, 8 and 9, the spring-mattress frame of the bed, instead of being a single section, may also be of any other suitable type and comprise, notably (if a relatively wide double bed is contemplated while avoiding the central hollow which is a source of discomfort), an axial beam 82 consisting of three elements similar to elements 1, 2 and 3, which are pivoted at 83, 84 corresponding to pivots 4 and 5 of the side longitudinal beams, and carried by three supporting legs 85, 86 and 87 corresponding to the legs 7, 8 and 9 respectively with stiffening gussets 77. These supporting legs may be mounted on castors 75 and supporting leg 85 may be rigidly assembled with the central coffer section 62 at 88. The lateral supporting legs 7, 8 and 9 as well as the intermediate supporting legs 85, 86 and 87 comprise stiffening bracing members 89, 90 and 91, respectively.

Each long panel 17 (FIG. 11) carries a female member 78 adapted to engage a lug 79 welded on the longitudinal beam of element 3. The long panels 16 and 17 are furthermore fastened by means of screws or bolts 80 to the flanges 81 (FIGS. 7-9) protecting the mattress 71. Each longitudinal panel 16 is slidably mounted to permit movement relative to the frame by means of a guide member 93 on the panel 16 slidably receiving a widened portion 94 of rod 15. A stop may be provided for locking the element 16 in its two end positions. The long panels 16, 17 are pivotally interconnected with one another at 92.

In order to keep the bed complete with its bedding in its closed position when folded, a lock 68 is provided on the registering portions of the long panel 17 and of panel 76 of coffer section 21.

Although the present invention has been described in conjunction with a preferred embodiment, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. In a folding bed consisting of a three-element metal frame of which two end elements of same length are hingedly connected to a shorter intermediate element and carried by pairs of legs pivoted thereon and having extensions adapted to act in turn as pivot means to connecting links for retracting said legs in synchronism along said end elements during the folding movements of said frame elements toward each other about their hinge connections on said intermediate element, the arrangement of a panel of a height corresponding substantially to the length of said intermediate element, which is secured at right angles to the head element of the bed, of a substantially U-shaped coffer having the same width as the bed and a height inferior to the length of the foot element of the bed, of rods pivoted at one end on said coffer and at the other end on said connecting links for retracting said legs of said foot element, said rods being so disposed as to apply said coffer against said foot element of the bed when said bed is closed and to cause said coffer to rest on the floor at right angles to said foot element when the bed is unfolded, and of another substantially U-shaped coffer secured on the pair of legs adjacent to said intermediate element, which is of same width as said first coffer and of such a height that it constitutes the continuation of said first coffer when the bed is closed.

2. In a folding bed consisting of a three-element metal frame of which two end elements of same length are hingedly connected to a shorter intermediate element and carried by pairs of legs pivoted thereon and having extensions adapted to act in turn as pivot means to connecting links for retracting said legs in synchronism along said end elements during the folding movements of said frame elements toward each other about their hinge connection on said intermediate element, the arrangement of a panel of a height corresponding substantially to the length of said intermediate element, which is secured at right angles to the head element of the bed, of a substantially U-shaped coffer having the same width as the bed and a height inferior to the length of the foot element of the bed, of rods pivoted at one end on said coffer and at the other end on said connecting links for retracting said legs of said foot element, said rods being so disposed as to apply said coffer against said foot element of the bed when said bed is closed and to cause said coffer to rest on the floor at right angles to said foot element when the bed is unfolded, and of another substantially U-shaped coffer secured on the pair of legs adjacent to said intermediate element, which is of same width as said first coffer and of such a height that it constitutes the continuation of said first coffer when the bed is closed, the added heights of said first and second U-shaped coffers of said foot element being slightly greater than the length of said foot element, the height of the upper coffer being such that said coffer bears on the floor when the bed is unfolded.

3. In a folding bed consisting of a three-element metal frame of which two end elements of same length are hingedly connected to a shorter intermediate element and carried by pairs of legs pivoted thereon and having extensions adapted to act in turn as pivot means to connecting links for retracting said legs in synchronism along said end elements during the folding movements of said frame elements toward each other about their hinged connections on said intermediate element, the arrangement of a panel of a height corresponding substantially to the length of said intermediate element, which is secured at right angles to the head element of the bed, of a substantially U-shaped coffer having the same width as the bed and a height inferior to the length of the foot element of the bed, of rods pivoted at one end on said coffer and at the other end on said connecting links for retracting said legs of said foot element, said rods being so disposed as to apply said coffer against said foot element of the bed when said bed is closed and to cause said coffer to rest on the floor at right angles to said foot element when the bed is unfolded, and of another substantially U-shaped coffer secured on the pair of legs adjacent to said intermediate element, which is of same width as said first coffer and of such a height that it constitutes the continuation of said first coffer when the bed is closed, and balancing spring means disposed between the member connecting the foot-element control rods, which is pivoted on said intermediate element, and said links, on the one hand, and the ends of said foot-element coffer control rods, on the other hand.

References Cited by the Examiner

UNITED STATES PATENTS

| | | | |
|---|---|---|---|
| 1,023,562 | 4/12 | Haberman | 5—2 X |
| 1,868,642 | 7/32 | Schlesinger | 5—4 |
| 2,950,485 | 8/60 | Hall | 5—4 |
| 2,982,973 | 5/61 | Faver | 5—4 |
| 3,025,535 | 3/62 | Ducrot | 5—42 |

FOREIGN PATENTS

| | | |
|---|---|---|
| 29,125 | 7/10 | Sweden. |
| 131,068 | 12/32 | Austria. |
| 807,987 | 10/36 | France. |
| 724,507 | 2/55 | Great Britain. |
| 534,716 | 10/55 | Italy. |
| 1,206,708 | 8/59 | France. |

FRANK B. SHERRY, *Primary Examiner.*

GEORGE L. BREHM, CHANCELLOR E. HARRIS,
*Examiners.*